United States Patent [19]

Sullivan et al.

[11] 4,452,100

[45] Jun. 5, 1984

[54] DIFFERENTIAL SPEED LIMITING DEVICE

[75] Inventors: William C. Sullivan, Newark, Ohio; Spencer M. Nimberger, Houston, Tex.

[73] Assignee: Rockwell International Corporation, Pittsburgh, Pa.

[21] Appl. No.: 306,028

[22] Filed: Sep. 28, 1981

[51] Int. Cl.³ .......................... F16H 1/44; F16D 11/06
[52] U.S. Cl. ........................................ 74/711; 192/52; 192/70.21
[58] Field of Search ................. 74/710.5, 711; 192/52, 192/70.21, 85 AA, 103 R; 417/474

[56] References Cited

U.S. PATENT DOCUMENTS

| 3,015,970 | 1/1962 | Mueller | 74/711 |
| 3,230,795 | 1/1966 | Mueller | 74/711 |
| 4,012,968 | 3/1977 | Kelbel | 74/711 |
| 4,025,241 | 5/1977 | Clemens | 417/474 |
| 4,041,804 | 8/1977 | Clark | 74/711 |

Primary Examiner—Allan D. Herrmann
Assistant Examiner—Joseph M. Rolnicki

[57] ABSTRACT

A differential speed limiting device is for limiting the relative rotational speed between a first member and a second member of a differential which are capable of independent rotation about a common axis of rotation. A plurality of friction discs are alternatively secured to the first and second members and capable of being axially compressed to generate frictional contact therebetween tending to reduce the relative rotation between the first and second members. A peristaltic pump is mounted relative to the members so that relative rotation therebetween produces a peristaltic pumping of fluid which can be applied to an annular bellows to produce the axial movement required to compress the plurality of friction discs.

23 Claims, 7 Drawing Figures

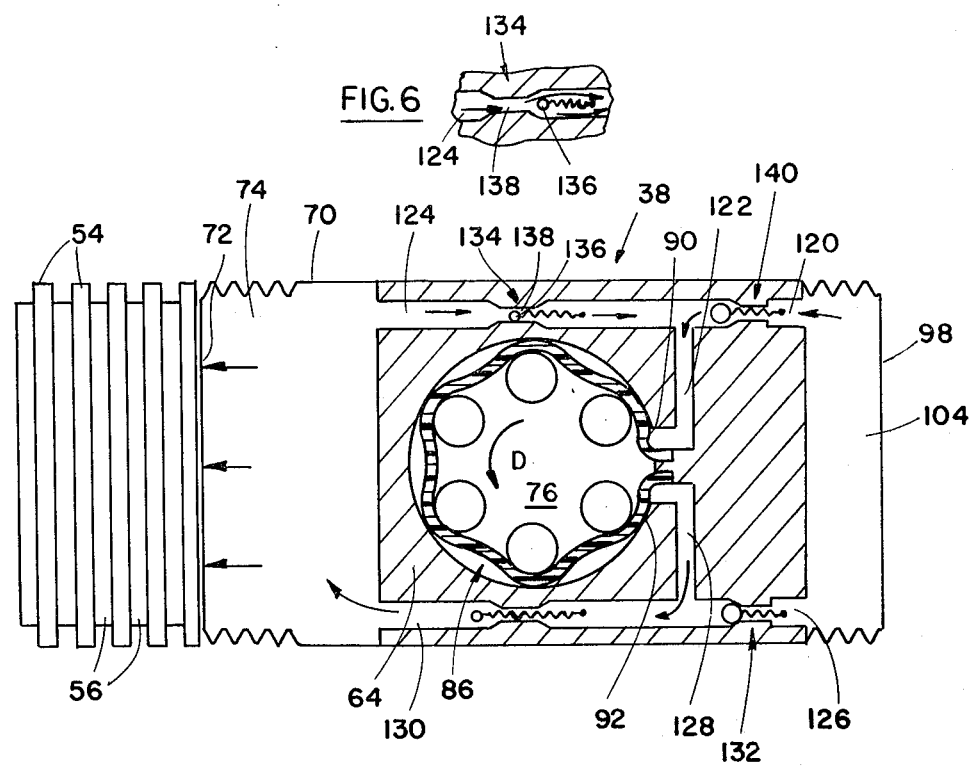
FIG.6
FIG.5
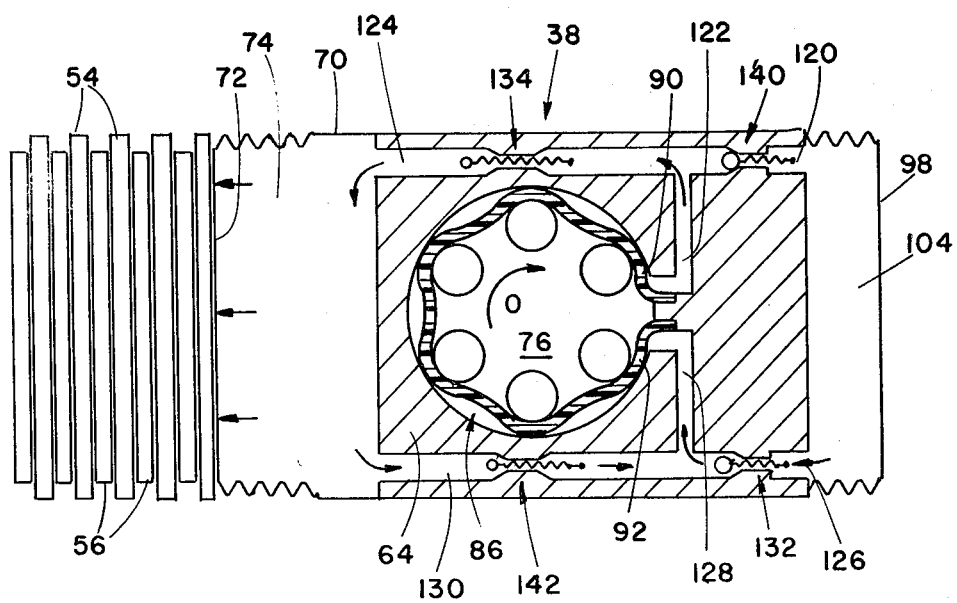
FIG.7

DIFFERENTIAL SPEED LIMITING DEVICE

BACKGROUND OF THE INVENTION

1. Field of the Invention

This invention relates to a differential speed limiting device and, more specifically, to such a device which is totally self-contained and capable of generating sufficient force to a plurality of braking discs tending to limit the relative rotational speed between a pair of independently mounted rotating members.

2. Description of the Prior Art

Differentials for automotive vehicles have been employed in the art for many years to permit the movement of the driven wheels at different speeds when the vehicle is traveling on a curve. Similarly, differentials have been utilized in tandem axle configurations for allowing each of the pair of axles to be operated at different speeds according to the road or operating condition.

While the differentiation provided is generally desirable for tire wear and safe vehicle operation, there are occasions when it is preferable to prevent the differential action when one of the wheels or axles have lost traction on ice, mud, gravel or the like. In such a condition, the power is simply provided to the slipping wheel or axle which is incapable of providing sufficient traction for the movement of the vehicle.

Although there have been heretofore provided a number of devices for "locking out" such differentials, these devices have often required operator action, have been incapable of providing sufficient torque to properly limit the relative rotation, or have been relatively complicated and expensive to maintain.

SUMMARY OF THE INVENTION

It is, therefore, an object of this invention to provide a differential speed limiting device which is capable of limiting relative rotational speed between a first member and a second member without any outside action required by the vehicle operator.

It is another object of the invention to provide such a differential speed limiting device which is relatively maintenance free and intended to operate the life of the vehicle.

These and other objects of the invention are found in a preferred embodiment thereof in the form of a differential speed limiting device for limiting the relative rotational speed between a first member and a second member capable of independent rotation about a common axis of rotation. First and second friction disc means are respectively mounted for rotation with the first and second members and capable of being compressed axially to generate frictional contact therebetween tending to reduce the relative rotation between the first and second members. An annular pump housing is mounted for rotation with the first member and has an annular bellows mounted thereon having an extended end aligned with the first and second friction disc means. The extended end is capable of axial movement toward and away from the first and second friction disc means when fluid under pressure is respectively supplied to and discharged from an interior of the bellows means. The pump housing has an interior cylindrical surface located therein. A length of collapsable tubing means has a first end and a second end and is formed into a single loop about the interior cylindrical surface with the loop lying in a plane which is normal to the common axis. Planetary roller means are mounted in the plane for rotation with the second member and in frictional surface contact with the tubing means. The roller means is of such radial dimensions as to compress the tubing means against the interior cylindrical surface in a region of contact. A reservoir for the fluid is located in the pump housing. There is a first passage means for the fluid between the reservoir and the first end of the tubing means and a second passage means for fluid between the second end of the tubing means and the interior of the bellows means. The second member is capable of rotating in a first direction relative to the first member to cause the roller means to circumferentially travel along the tubing means from the first end to the second end to produce peristaltic pumping of the fluid from the reservoir through the first passage means, the tubing means and the second passage means to the interior of the bellows means to produce the pressure of the fluid therein. There is also means for discharging the fluid from the interior of the bellows means to the reservoir to relieve the pressure of the fluid in the interior of the bellows means when there is no rotation of the second member relative to the first member.

BRIEF DESCRIPTION OF THE DRAWINGS

FIG. 5 is a schematic drawing like that in FIG. 4 demonstrating the operation of the preferred embodiment tending to prevent relative rotation between the members.

FIG. 6 is a fragmentary view of the elements shown in FIG. 5 when the preferred embodiment is operating under an extreme differential speed condition.

FIG. 7 is a schematic drawing of the preferred embodiment demonstrating the operation when the relative rotational speed between the members is in the opposite direction from that shown in FIG. 6.

DESCRIPTION OF THE PREFERRED EMBODIMENT

Figure 1:
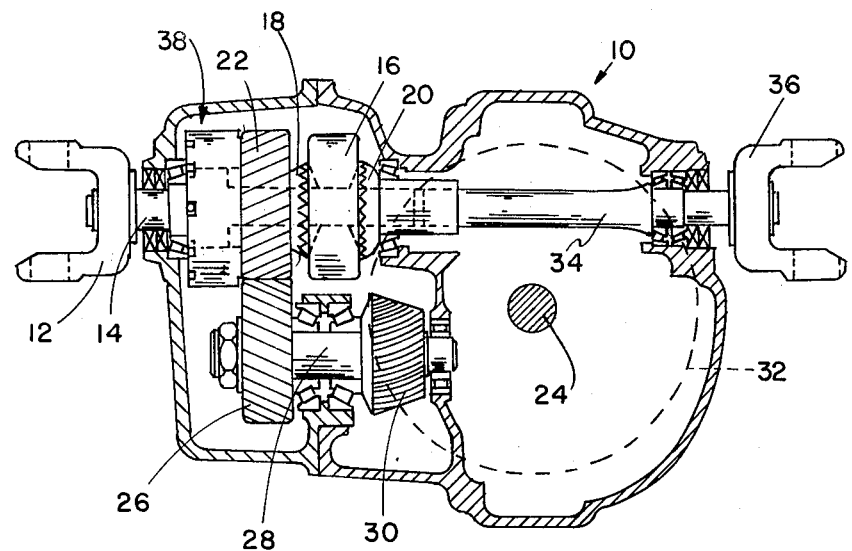
FIG. 1 is a sectional, elevational view of an interaxle differential assembly including the preferred embodiment of the invention.

As seen in FIG. 1, an interaxle differential carrier 10 is of the type which is commonly utilized in heavy duty trucks to provide power to a pair of tandem drive axles. A coupling 12 is utilized to receive input power from a transmission or the like for the operation of an input shaft 14. The input shaft 14 extends rearwardly to drive the interaxle differential 16 which includes a first side gear 18 and a second side gear 20. The first side gear 18 is directly joined to a drive gear 22 for the operation of the forward drive axle 24. Specifically, the drive gear 22 is in meshing engagement with a driven gear 26 which is mounted for rotation on a shaft 28. A helical pinion gear 30 on the rearward end of the shaft 28 is in engagement with a ring gear 32 which operates the differential for the forward drive axle 24 in a manner which is well known in the vehicle power transmitting art. The second side gear 20 is rigidly joined to a shaft 34 which extends rearwardly to include a coupling 36 on the rearward end thereof for the operation of the rearward drive axle (not shown).

Accordingly, the input shaft 14 will operate the differential 16 to provide power to the forward drive axle and/or the rear drive axle. Under ideal operating conditions, there would be no difference in the rotational speed of the two axles and the input shaft 14 would rotate at the same speed as the side gears 18 and 20. However, if there is a loss of traction at one of the axles, differentiation would occur so that a relative rotational speed would exist between the input shaft 14 and the gear 22 associated with the side gear 18. To limit the relative rotational speed between these two members, a preferred embodiment of the invention is provided in the form of a differential speed limiting device 38. The differential speed limiting device 38 is mounted about the input shaft 14 at a location thereon which has heretofore been utilized for providing different prior art means for preventing the relative rotation which can be produced by the interaxle differential 16. For example, there has heretofore been included at this location a mechanical coupling device which can be selectively used by the operator of the vehicle for directly coupling the input shaft 14 to the drive gear 22. However, the differential speed limiting device 38 of the present invention is self-contained and includes means for automatically limiting the relative rotational speed without any action being required by the vehicle operator. The preferred embodiment will be seen to be operable in either direction but only after a minimum relative rotation speed is experienced.

Figure 2:
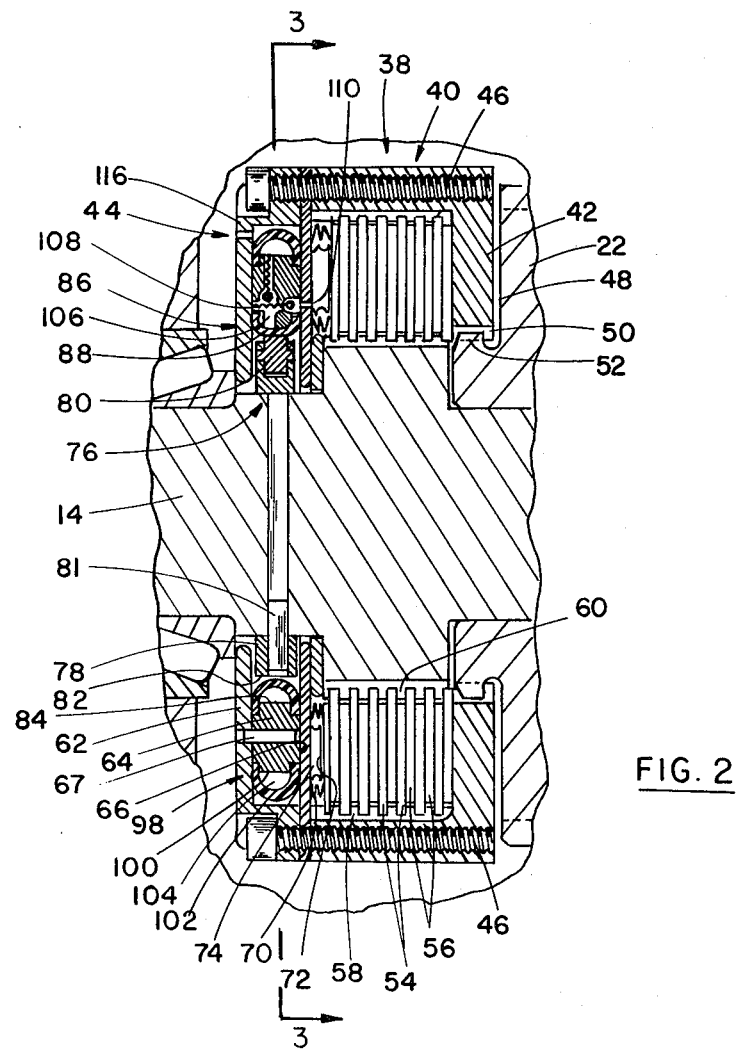
FIG. 2 is a fragmentary sectional view of the embodiment shown in FIG. 1.
Figure 3:
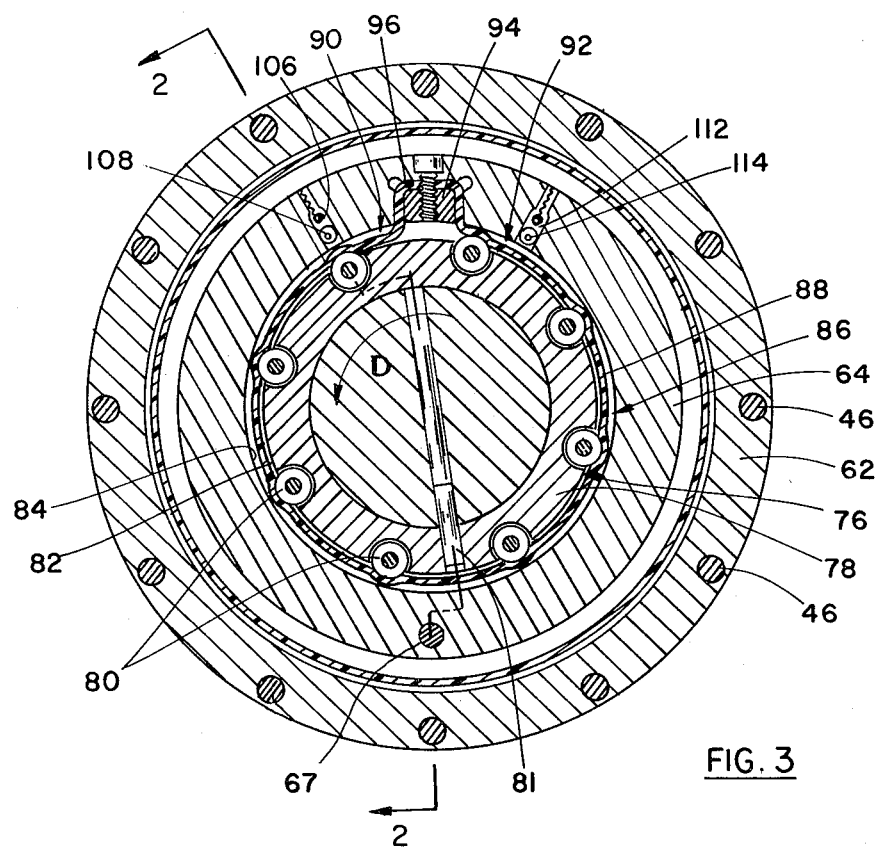
FIG. 3 is a view as seen along line 3—3 of FIG. 2.

As seen in FIGS. 2 and 3, the preferred differential speed limiting device 38 basically includes an annular housing 40 which is mounted to extend about the input shaft 14. The housing 40 has two basic parts, one portion 42 which houses friction disc means and an annular pump portion 44 which includes the means for operating the friction disc means. The pump portion 44 and the friction disc portion 42 are rigidly joined together by a plurality of axially extending bolts 46. The friction disc portion 42 includes an end 48 thereof which has inwardly extending tooth means 50 which are in engaging contact with outwardly extending tooth means 52 of the drive gear 22 to cause the entire housing 40 to rotate therewith. A first plurality of friction discs 54 and a second plurality of friction discs 56 are mounted within the housing portion 42. The first plurality of friction discs 54 are joined at their outer extremities to axially extending splines 58 within the interior of the friction disc portion 42 to insure their rotation with the housing 40. The interior extremities of the friction discs 56 are secured to axially extending splines 60 on the input shaft 14 to cause them to rotate with the input shaft 14. Accordingly, the friction discs 54 and 56 will be relatively rotated according to the relative rotation of the input shaft 14 and the drive gear 22 until some outside force is applied to axially compress the friction discs to create frictional contact therebetween tending to reduce the relative rotation between the input shaft 14 and the drive gear 22.

To produce the desired compressive force on the friction discs 54 and 56, the pump housing portion 44 includes a means for generating fluid pressure through a peristaltic pumping of the fluid during relative rotation of the input shaft 14 and the drive gear 22 in a manner which will be described in detail hereinbelow. Structurally, the pump portion 44 includes a radial end plate 62, an interior annular wall 64 and an interior radial plate 66. The plates 62 and 66 are joined by the bolts 46 and the interior annular wall 64 is retained therebetween and prevented from relatively rotating by a pin 67.

An annular bellows means 70 is sealingly secured to the interior plate 66 in alignment with the friction discs 54 and 56 and includes an extended end 72 which is capable of axial movement toward and away from the friction discs 54, 56 when fluid under pressure is supplied to and discharged from the interior 74 of the annular bellows means 70.

To create sufficient pressure within the interior 74 of the annular bellows means 70, the pump housing part 44 includes a peristaltic pumping configuration for generating the pressure and a reservoir for maintaining a sufficient supply of hydraulic oil to serve as the operating fluid for the differential speed limiting device. In the preferred embodiment, the annular wall 64 basicially supports the pumping mechanism and the reservoir and further includes a plurality of bores therethrough to provide fluid passages for the operation of the pump and the annular bellows means 70.

To produce peristaltic pumping of the fluid during rotation of the input shaft 14 relative to the gear 22, the pump portion 44 supports a collapsable tubing means for producing the pumping and the input shaft 14 supports a planetary roller means 76 which will, during relative rotation, progress along the tubing means to cause the fluid to be pumped in a manner which is well known in the peristaltic pumping art. The planetary roller means 76 includes a ring 78 which closely encircles the shaft 14 and is prevented from any rotation relative thereto by being pinned at 81 to the shaft 14. A plurality of rollers 80 are mounted on the ring 78 and are provided with radial dimensions which extend beyond the exterior surface 82 of the ring 78 so that they will compress a tubing means having fluid located therein to cause the fluid entrapped between the area of contact at adjacent rollers to be progressively transmitted along the interior of the tubing means whenever there is relative rotation between the planetary roller means 76 and the tubing means.

To insure that such a tubing means is properly compressed, the tubing means in peristaltic pumps are generally supported by a cylindrical surface. For this purpose, the annular wall 64 includes an interior cylindrical surface 84. In the preferred embodiment, a length of collapsable tubing means 86 is formed into a single loop about the interior cylindrical surface 84 so that the loop of collapsable tubing means 86 lies in a plane which is normal to the common axis and identical to the plane which includes the planetary roller means 76. However, rather than having the more familiar tubing means used in peristaltic pumps which has a circular cross section, the preferred embodiment utilizes a collapsable tubing means 86 having a collapsable wall 88 with a U-shaped cross section to include terminal edges thereof which are sealingly joined at the opposite axial ends of the annular wall 64. Specifically, the terminal edges of the collapsable wall 88 are compressed in grooves adjacent the interior cylindrical surface 84 as they are entrapped between the radial plates 62 and 66 and the annular wall 64. It will be seen that the utilization of such a collapsable tubing means will facilitate fluid passage means for the operation of the pump and will thereby eliminate any external tubing or piping which is generally found in peristaltic pumps.

The U-shaped collapsable wall 88 has a first end 90 and a second end 92 which have terminal portions thereof which are joined to and sealingly secured by a fitting 94 which is received within a cavity 96 of the annular wall 64. With the terminal portions sealed in this manner, rotation of the input shaft 14 relative to the drive gear 22 in a first direction D as indicated by the arrow in FIG. 3 will cause peristaltic pumping of fluid within the interior of the collapsible tubing means 86 from the first end 90 to the second end 92.

To provide a reservoir for the hydraulic oil which is the operating fluid for the differential speed limiting device 38, the annular wall 64 also supports a annular reservoir 98 at an outer cylindrical surface 100 thereof in a manner similar to that which was utilized to support the collapsable wall 88. The reservoir 98 includes an expandable wall 102 which has terminal edges which are sealingly secured to the opposite axial ends of the annular wall 64 adjacent the outside cylindrical surface 100. Again, grooves at the edges of the outer cylindrical surface 100 receive the terminal edges of the U-shaped wall 102 of the reservoir 98 to cause them to be sealingly compressed between the plates 62 and 66 and the wall 64. Unlike the collapsable wall 88 of the tubing means 86, the wall 102 of the reservoir 98 in the preferred embodiment is continuous to completely encircle the annular wall 64 without any interruption which could interfere with the retention of fluid therein.

To allow passage of the operating fluid from an interior 104 of the reservoir 98 to the collapsable tubing means 86 and then to the interior 74 of the bellows means 70, a series of bores are provided within the interior of the annular wall 64. At the first end 90 of the collapsable tubing means 86, a radially extending bore 106 allows communication with the interior 104 of the reservoir 98. Additionally, there is provided at the end 90 an axially extending bore 108 which intersects the radial bore 106 and terminates at a hole 110 in the plate 66 to allow communication between the interior 74 of the annular bellows means 70 and the first end 90 of the collapsable tubing means 86. Each of the bores 106 and 108 includes biased check means or flow restricting means which will be better explained hereinbelow during a discussion of the total operation of the differential speed limiting device 38. However, since the preferred differential speed limiting device 38 is intended to operate effectively in either direction of relative rotation, there are similar bores provided at the second end 92 of the collapsable tubing means 86. The radial bore 112 is identical to the bore 106 and the axially extending bore 114 is identical to the bore 108. Additionally, although not show in any of the drawings, there is an additional hole similar to hole 110 provided in the plate 66 which is aligned with the axial bore 114.

It should now be clear from the description provided hereinabove that the sealing of the terminal edges of the wall 102 of the reservoir 98, the sealing of the terminal edges of the U-shaped wall 88 of the collapsable tubing means 86 and the sealing of the annular bellows means 70 to the radially extending plate 66 provides a sealed, closed interior for the retention of the operating fluid required for the proper functioning of the differential speed limiting device 38. Since the reservoir 98 is expandable, a specific quantity of fluid is initially charged to the system and any transfer of fluid from the reservoir 98 to the interior 74 of the bellows 70 is compensated by contraction of the wall 102 of the reservoir 98. To insure that outside pressure forces will not interfere with the expansion and contraction of wall 102, the pump portion 44 of the housing 40 is provided a small hole 116 to communicate its interior with the pressure within the inner axle differential housing to provide a reference background pressure for the operation of the reservoir 98. As a result, the differential speed limiting device 38 will be seen to be relatively maintenance free and includes temperature and pressure compensation means in the form of an expandable reservoir 98 so that a fixed quantity of hydraulic oil can be initially supplied and continuously retained for the operation of the differential speed limiting device 38. Consequently, the hydraulic oil within the differential speed limiting device 38 is totally separate from and independent of the lubricating oil system found in the interaxle differential and no mixture of these oils will result throughout the life of the differential speed limiting device.

Although the embodiment shown in FIGS. 2 and 3 is the preferred embodiment and includes sufficient information for one to see the structural relationships which are required for the proper functioning of the preferred differential speed limiting device 38, there are a number of features which can best be explained by a schematic representation of the invention. Accordingly, FIGS. 4-7 have been included to show a schematic view of the invention which can be directly related to the embodiment shown in FIGS. 2 and 3. For this purpose, where appropriate, identical numbers will be utilized but there might be included additional numbers to describe features which could not be properly demonstrated in FIGS. 2 and 3 and which will provide a broader understanding of the invention to include other embodiments rather than being limited to the specific embodiment as shown in FIGS. 2 and 3.

Figure 4:
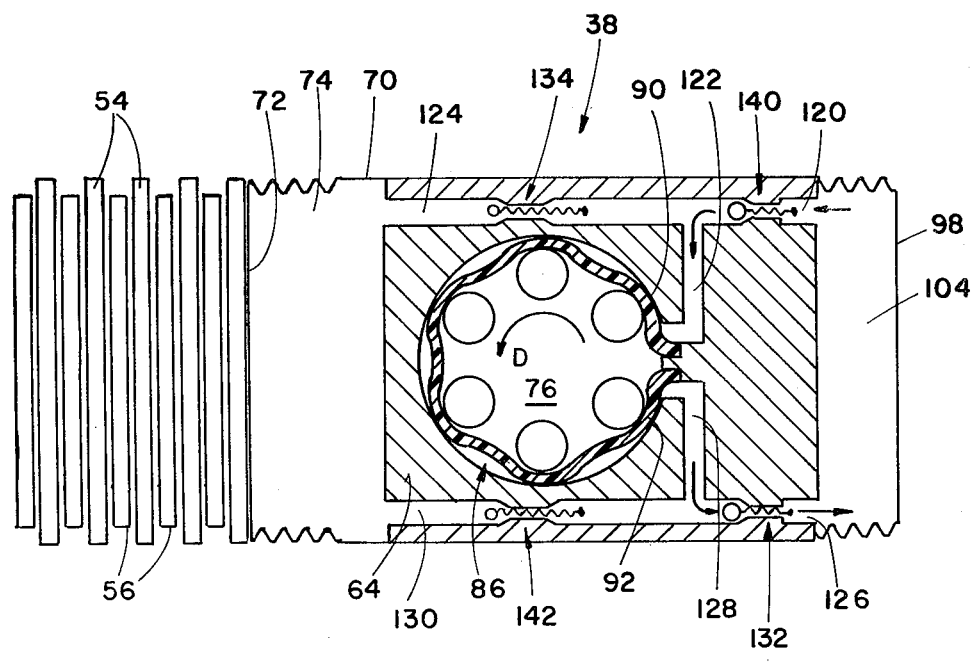
FIG. 4 is schematic drawing of the preferred embodiment of the invention prior to any significant relative rotation between the affected members associated with the interaxle differential of FIG. 1.

As seen in FIG. 4, the schematic view of the differential speed limiting device 38 includes the planetary roller means 76 which is disposed within the interior of the annular wall 64 and rotating slowly in the first direction D. There are included paths 120, 122 and 124 for the fluid through the annular wall 64 associated with the first end 90 of the collapsable tubing means 86. The path 120 is found at the outer portion of the bore 106; the path 122 at the inner portion of the bore 106 and the path 124 is through the bore 108. There are also included paths 126, 128 and 130 through the annular wall 64 which are associated with the second end 92 of the collapsable tubing means 86. The path 126 is at the outer portion of the bore 112; the path 128 is at the inner portion of the bore 112 and the path 130 is through the bore 114.

To supply hydraulic fluid from the interior 104 of the reservoir 98 to the interior 74 of the bellows means 70 to cause its extended end 72 to compress the friction discs 54, 56, the hydraulic fluid would need to be carried by the peristaltic pumping through a first passage means 120, 122 (including the paths 120 and 122) to the first end 90 of the collapsable tubing means 86. The peristaltic pumping would cause the fluid entrapped within the collapsable tubing means 86 to be delivered to the second end 92 for the fluid to be transmitted by a second passage means 128, 130 (including the paths 128 and 130) to the interior 74 of the bellows means 70. However, the differential speed limiting device 38 is not intended to supply fluid for limiting the relative rotational speed at all magnitudes but is rather intended to prevent excessive relative rotation between the input shaft 16 and the drive gear 22. Accordingly, at the relatively low differential speeds as shown in FIG. 4, the fluid would travel through a first passage means 120, 122 from the interior 104 of the reservoir 98 and then be supplied to a fourth passage means 126, 128 for re-entry into the interior 104 of the reservoir 98. In other words, at the relatively low differential rotational speeds between the input shaft 16 and the drive gear 22 the fluid will not be directed to the bellows means 70 but will simply be withdrawn from the reservoir 98 and returned to the reservoir 98 without causing any breaking action which might limit the relative rotational speed between the members. The condition at which this by-passing will occur will depend upon the predetermined setting of a first flow sensitive element 132 in the path 126. The flow sensitive element 132 is preferably a ball stop check valve which is biased to an open position against flow into the interior 104 of the reservoir 98. If the relative rotational speed in the first direction D does not exceed about 50 r.p.m., for example, the flow created by the peristaltic pumping will be insufficient to cause the ball check valve of the first flow sensitive element 132 to be seated against the biasing included therein. In one embodiment of the invention, the peristaltic pumping of the fluid as the relative rotational speed approaches 50 r.p.m. will produce a fluid flow approaching about 1 gallon per minute through the path 126. At a flow of about 1 gallon per minute a force of about 2 pounds would be generated on the ball of the flow sensitive element 132 which would be sufficient to cause it to be fully seated and prevent any further return of fluid to the interior 104 of the reservoir 98.

In this condition, as seen in FIG. 5, the ball of the first flow sensitive element 132 will prevent the by-passing of fluid to the reservoir and the fluid being supplied by the second end 92 of the collapsable tubing means 86 will by necessity be directed to the second passage means 128, 130 to apply the desired pressure to the interior 74 of the bellows means 70. Generally, in this condition, the amount of pressure being generated to produce the axial movement of the extended end 72 of the bellows means 70 will depend upon the magnitude of the relative rotational speed of the input shaft 14 to the drive gear 22 in the first direction D. However, although it can now be seen under what conditions the second passage means 128, 130 will be utilized for the supply of the operating fluid to the bellows means 70, a third passage means 124, 120 would appear to allow the fluid to escape from the interior 74 of the bellows means 70 and to thereby prevent the proper axial movement of the extended end 72.

However, within the path 124 there is included a first means for restricting the flow of the fluid in the form of a flow restrictor 134. The flow restrictor 134 also includes a ball element 136 which is biased against flow from the interior 74 of the bellows means 70 to the interior 104 of the reservoir 98. However, any flow in this direction will tend to compress the spring of the flow restrictor 134 to cause the ball 136 to be positioned within a region 138 of reduced cross section to allow some flow of the fluid around the ball 136 throughout the time it is positioned within the region 138 of reduced cross section. In this condition, the ball 136 will sufficiently restrict the flow of fluid to maintain the flow at a flow rate in the third passage means 124, 120 which is less than that being provided by the peristaltic pumping in the second passage means 128, 130. If the flow rate in the second passage means 128, 130 is maintained at this higher flow rate, then the pressure of the fluid within the interior 74 of the bellows means 70 will be sufficiently established to cause axial movement of the extended end 72 to compress the friction discs 54, 56 as shown in FIG. 5.

Again, by way of example, it has been found that the peristaltic pumping of the preferred differential speed limiting device 38 can be sufficient to generate pressures within the interior 74 which approach 100 p.s.i. However, because of the general structure of the bellows means 70, it is not considered necessary nor desirable to generate fluid pressures which exceed the 100 p.s.i. level. Therefore, as shown in FIG. 6, the arrangement of the ball 136 in the flow restrictor 134 is such that the creation of a pressure approaching 100 p.s.i. will sufficiently compress the spring of the flow restrictor 134 to cause the ball 136 to be positioned outwardly of the region 138 of reduced cross section. When the ball 136 is so positioned, the fluid rate in the flow restrictor 134 will be significantly increased tending to limit the amount of pressure which can be provided to the interior 74 of the bellows means 70. As the fluid is allowed to escape from the interior 74 through the fluid restrictor 134, it may be returned to the interior 104 of the reservoir 98 through the third passage means 124, 120. Admittedly, some of the fluid might again be directed through the path 122 to supply the first end 90 of the collapsable tubing means 86. However, if the relative rotation were quickly reduced to zero, the third passage means 124, 120 would be necessary to relieve the pressure within the interior 74 of the bellows means 70 and allow the fluid to be returned to the interior 104 of the reservoir 98. There may be some concern that such a return flow would be sufficient to cause a second flow sensitive element 140, which is identical to the first flow sensitive element 132, in the path 120 to be seated and thereby prevent any flow to the interior 104. However, the flow restrictor 134 is preferably designed to allow a maximum flow rate, for example, approximately 1/10 of a gallon per minute, which is significantly less than the 1 gallon per minute required to seat the ball element in the second flow sensitive element 140. Consequently, the second flow sensitive element 140 would remain open for the return of the operating fluid to the reservoir 98.

As has heretofore been mentioned, the preferred differential speed limiting device 38 will properly function in either direction of rotation of the input shaft 14 relative the drive gear 22. However, the description provided hereinabove has been directed to the means for limiting the relative rotational speed in only the first direction D. Although the various paths have all been utilized for the flow of fluid in the specifically defined passage means for rotation in the direction D, the same paths can be utilized when the relative rotation is in the opposite direction O as indicated in FIG. 7. The rotation of the planetary roller means 76 in the direction O is assumed, in FIG. 7, to be at a level which would again cause seating of the second flow sensitive element 140 to prevent the by-passing feature allowing the fluid to be returned to the interior 104 of the reservoir 98. As a result, fluid will be drawn through the fourth passage means 126, 128 to the second end 92 of the collapsable tubing means 86 and discharged from the first end 90 for supply through a fifth passage means 122, 124 to the interior 74 of the bellows means 70. Again, as pressure builds up within the interior 74 of the bellows means 70, a flow restrictor 142 in the path 130, which is identical to the flow restrictor 134, would allow a building up of pressure within the interior 74 but still enable it to be returned to the interior 104 of the reservoir 98 along a sixth passage means 130, 126 should it be necessary.

Accordingly, to facilitate the operation of the differential speed limiting device 38 in either direction, the flow sensitive elements 132, 140 are designed to freely allow fluid to be drawn from the interior 104 of the reservoir 98 and to be returned to the interior 104 unless there is a sufficient pressure generated by the differential rotational speed to justify the use of the friction discs 54, 56. Similarly, the inclusion of a high pressure in the interior 74 of the bellows means 70 will be generally maintained by either of the flow restrictors 134, 142 but neither will prevent the pressure from being entrapped within the interior 74 of the bellows means 70 when the relative rotational speed has been sufficiently reduced to discontinue the application of compressive force to the friction discs 54, 56. In other words, the flow sensitive elements 132, 140 and the flow restrictors 134, 142 will only function to decrease or prevent the flow of fluid in one direction for the effective operation of the differential speed limiting device 38 but will allow fluid to flow freely in the other direction if that direction is required for the proper operation of the differential speed limiting device.

As thus explained, it can now be seen that the preferred differential speed limiting device 38 includes a number of features which are attractive for the limiting of relative rotational speed between a first member and a second member which are capable of independent rotation about a common axis of rotation. Specifically, the differential speed limiting device will operate in either direction of rotation and includes no running seals which might interfere with the retention of the operating fluid therein. Since the hydraulic oil utilized as the operating fluid is retained within a totally sealed system, there can be no fluid contamination and the inclusion of an expandable reservoir 98 insures that the fluid will be capable of responding to temperature and pressure variations without affecting the operation of the speed limiting device 38. There is also included an overload protection in the form of the flow restrictors 134, 142 which will function to increase the flow rate therethrough when the pressure is building up to an excessive level within the interior 74 of the bellows means 70.

Additionally, the operation of the differential speed limiting device 38 is totally automatic and is independent of any operator control so that it will engage and disengage automatically depending upon the magnitude of the relative rotational speed. Similarly, since the compressive force will not be applied to the friction discs 54, 56 until a minimum relative rotational speed is exceeded, there will be no excessive wear of the friction discs 54, 56. However, as normal wear is experienced in the friction discs 54, 56, the arrangement of the bellows means 70 is such that the device will function automatically to compensate for the wear thereof throughout the expected life of the differential speed limiting device 38.

Further, although the preferred embodiment is shown to be utilized in an interaxle differential configuration, it should be clear that a similar device could be installed in the normal differential configuration utilized on a drive axle. Since the device is simple, compact and self-contained, the differential speed limiting device of the present invention could be utilized in prior art differential configurations with little or no redesign of components to provide the desired automatic speed limiting function.

We claim:

1. A differential speed limiting device for limiting the relative rotational speed between a first member and a second member capable of independent rotation about a common axis of rotation, said differential speed limiting device comprising:

first and second friction disc means respectively mounted for rotation with said first and said second members and capable of being compressed axially to generate frictional contact therebetween tending to reduce said relative rotational speed between said first and said second members;

an annular pump housing mounted for rotation with said first member;

an annular bellows means mounted on said pump housing and having an extended end aligned with said first and said second friction disc means, said extended end being capable of axial movement toward and away from said first and said second friction disc means when fluid under pressure is respectively supplied to and discharged from an interior of said bellows means;

said pump housing having an interior cylindrical surface located therein;

a length of collapsible tubing means having a first end and a second end and being formed into a single loop about said interior cylindrical surface, said loop lying in a plane which is normal to said common axis;

planetary roller means mounted in said plane for rotation with said second member and in frictional surface contact with said tubing means, said roller means being of such radial dimensions as to compress said tubing means against said interior cylindrical surface in a region of said contact;

a reservoir for said fluid in said pump housing;

a first passage means for said fluid between said reservoir and said first end of said tubing means;

a second passage means for said fluid between said second end of said tubing means and said interior of said bellows means;

said second member rotating in a first direction relative to said first member causing said roller means to circumferentially travel along said tubing means from said first end to said second end to produce peristaltic pumping of said fluid from said reservoir through said first passage means, said tubing means, and said second passage means to said interior of said bellows means to produce said pressure of said fluid therein; and means for discharging said fluid from said interior of said bellows means to said reservoir to relieve said pressure of said fluid in said interior of said bellows means when there is no rotation of said second member relative to said first member.

2. The differential speed limiting device as set forth in claim 1, wherein said means for discharging said fluid from said interior of said bellows means to said reservoir includes a third passage means for said fluid between said interior of said bellows means and said reservoir having a first means for restricting flow of said fluid from said interior of said bellows means to said reservoir to allow said pressure of said fluid in said interior of said bellows means to be established if said relative rotation in said first direction is sufficient to produce a first flow rate by said peristaltic pumping of said fluid within said second passage means to said interior of said bellows means which is greater than a second flow rate of said fluid through said first means for restricting said flow.

3. The differential speed limiting device as set forth in claim 2, wherein said first means for restricting said flow includes a flow restricting element disposed therein, said flow restricting element having cross sectional dimensions less than said reduced cross section to allow said fluid to flow within said length around said flow restricting element to establish said second flow rate of said fluid.

4. The differential speed limiting device as set forth in claim 3, wherein said flow restricting element is biased against said flow from said interior of said bellows means to said reservoir to be capable of remaining within said length until said pressure of said fluid in said interior reaches a maximum desired level and to be capable of being displace outwardly of said length to allow an increased flow of said fluid above said second flow rate when said pressure of said fluid in said interior of said bellows means is above said maximum desired level of said pressure.

5. The differential speed limiting device as set forth in claim 4, wherein said reduced cross section is circular and said flow restricting element has circular said cross sectional dimensions.

6. The differential speed limiting device as set forth in claim 5, wherein said flow restricting element is spherical.

7. The differential speed limiting device as set forth in claim 2, further including means for limiting said peristaltic pumping of said fluid to said interior of said bellows means until said relative rotation in said first direction exceeds a minimum rotational speed.

8. The differential speed limiting device as set forth in claim 7, wherein said means for limiting said peristaltic pumping to said interior of said bellows means includes a fourth passage means between said second end of said tubing means and said reservoir, said fourth passage means having a first flow sensitive element therein allowing a by-pass flow rate to said reservoir rather than to said interior of said bellows means until said relative rotation in said first direction exceeds said minimum rotational speed.

9. The differential speed limiting device as set forth in claim 8, wherein said first flow sensitive element is a stop check means which is biased open until said by-pass flow rate is exceeded when said relative rotation in said first direction exceeds said minimum rotational speed and remains closed until said relative rotation in said first direction is less than said minimum rotational speed.

10. The differential speed limiting device as set forth in claim 9, wherein said stop check means is a spring loaded, ball check valve.

11. The differential speed limiting device as set forth in claim 1, wherein said reservoir is sealed and includes an internal volume which is expandable to include only fluid therein.

12. The differential speed limiting device as set forth in claim 1, wherein said interior cylindrical surface is on an annular wall which is located within said pump housing.

13. The differential speed limiting device as set forth in claim 12, wherein said length of collapsable tubing means includes a collapsable wall having a U-shaped cross section and including terminal edges thereof which are sealingly joined at opposite axial ends of said annular wall adjacent said interior cylindrical surface so that a sealed interior of said collapsable tubing means is defined by an interior surface of said collapsable wall and said interior cylindrical surface.

14. The differential speed limiting device as set forth in claim 12, wherein said reservoir is sealed and includes an interior volume which is expandable to include only said fluid therein, said reservoir being generally annular and circumferentially extending about an outside cylindrical surface of said annular wall.

15. The differential speed limiting device as set forth in claim 14, wherein said interior volume of said reservoir is defined by said outside cylindrical surface and a generally U-shaped expandable wall having terminal edges thereof which are sealingly secured to opposite axial ends of said annular wall adjacent said outside cylindrical surface.

16. The differential speed limiting device as set forth in claim 1, further including a fourth passage means for said fluid between said reservoir and said second end of said tubing means, a fifth passage means for said fluid between said first end of said tubing means and said interior of said bellows means and said second member rotating in a second direction relative to said first member causing said roller means to circumferentially travel along said tubing means from said second end to said first end to produce peristaltic pumping of said fluid from said reservoir through said fourth passage means, said tubing means and said fifth passage means to said interior of said bellows means to produce said pressure of said fluid therein.

17. The differential speed limiting device as set forth in claim 16, wherein said means for discharging said fluid from said interior of said bellows means to said reservoir includes a third passage means for said fluid between said interior of said bellows means and said reservoir having a first means for restricting flow of said fluid from said interior of said bellows means to said reservoir to allow said pressure of said fluid in said interior of said bellows means to be established if said relative rotation in said first direction is sufficient to produce a first flow rate by said peristaltic pumping of said fluid within said second passage means to said interior of said bellows means which is greater than a second flow rate of said fluid through said first means for restricting said flow and a sixth passage means for said fluid between said interior of said bellows means and said reservoir having a second means for restricting said flow of said fluid which is identical to said first means for restricting said flow of said fluid from said interior of said bellows means to said reservoir to allow said pressure of said fluid in said interior of said bellows means to be established if said relative rotation in said second direction is sufficient to produce said first flow rate by said peristaltic pumping of said fluid within said fifth passage means to said interior of said bellows means which is greater than said second flow rate of said fluid through said second means for restricting said flow.

18. The differential speed limiting device as set forth in claim 17, further including means for limiting said peristaltic pumping of said fluid to said interior of said bellows means until said relative rotation in said first direction and said relative rotation in said second direction exceeds a minimum rotational speed.

19. The differential speed limiting device as set forth in claim 18, wherein said means for limiting said peristaltic pumping to said interior of said bellows means includes a first flow sensitive element within said fourth passage means allowing a by-pass flow rate to said reservoir rather than to said interior of said bellows means until said relative rotation in said first direction exceed said minimum rotational speed and a second flow sensitive element like said first flow sensitive element within said first passage means allowing said by-pass flow rate to said reservoir rather than to said interior of said bellows means until said relative rotation in said second direction exceeds said minimum rotational speed.

20. The differential speed limiting device as set forth in claim 19, wherein said third passage means includes a portion of said first passage means having said second flow sensitive element therein and said sixth passage means includes a portion of said fourth passage means having said first flow sensitive element therein and said by-pass flow rate exceeds said second flow rate.

21. The differential speed limiting device as set forth in claim 17, wherein said interior cylindrical surface is on an annular wall which is located within said pump housing, said length of collapsable tubing means includes a collapsable wall having a U-shaped cross section and including terminal edges thereof which are sealingly joined at opposite axial ends of said annular wall adjacent said interior cylindrical surface so that a sealed interior of said collapsable tubing means is defined by an interior surface of said collapsable wall and said interior cylindrical surface.

22. The differential speed limiting device as set forth in claim 21, wherein said reservoir is sealed and includes an interior volume which is expandable to include only said fluid therein, said reservoir being generally annular and circumferentially extending about an outside cylindrical surface of said annular wall, said interior volume of said reservoir being defined by said outside cylindrical surface and a generally U-shaped expandable wall having terminal edges thereof which are sealingly secured to said opposite axial ends of said annular wall adjacent said outside cylindrical surface.

23. The differential speed limiting device as set forth in claim 22, wherein said first, said second, said third, said fourth, said fifth and said sixth passage means are formed by holes in and extending through said annular wall.

* * * * *